Sept. 22, 1942.  M. P. CHAPLIN  2,296,808

REINFORCED MOLDED FIBER CONTAINER

Filed Oct. 31, 1940  2 Sheets—Sheet 1

Inventor,
Merle P. Chaplin

Sept. 22, 1942.   M. P. CHAPLIN   2,296,808
REINFORCED MOLDED FIBER CONTAINER
Filed Oct. 31, 1940   2 Sheets-Sheet 2

Inventor,
Merle P. Chaplin

Patented Sept. 22, 1942

2,296,808

UNITED STATES PATENT OFFICE 2,296,808

REINFORCED MOLDED FIBER CONTAINER

Merle P. Chaplin, South Portland, Maine, assignor to Chaplin Corporation, South Portland, Maine, a corporation of Maine Application October 31, 1940, Serial No. 363,791

6 Claims. (Cl. 229—2.5)

This invention relates to molded fiber containers or trays commonly known as butter or lard trays.

Containers or trays for this purpose have long been made of rectangular or oblong shape, where the length is from one and one-half to one and three-quarters the width. Both side and end walls are ordinarily formed from flat sheets sloping inwardly to permit the trays to be nested for shipment. The junction between the side and end walls may be substantially at right angles, or may be somewhat rounded depending on the materials and methods used in manufacture.

This general shape of container or tray is almost universally used in the delivery of such products as butter, lard, peanut butter, delicatessen products, etc. This particular shape has many advantages in handling and delivery of such products.

Such containers were, at one time, largely made of wood veneer, which had sufficient inherent stiffness and weight to make the container structurally strong. The cost of wood veneer, together with its bulk and weight, has largely resulted in the substitution of paper board and molded fiber containers. This material, however, does not have the stiffness and rigidity of wood veneer, and when employing the present shape and construction, is structurally weak.

It is the purpose of this invention to provide a structure which can be made of molded fibrous materials of light weight and minimum bulk, and still have the stiffness and rigidity desirable and necessary for such a container, while retaining its generally rectangular or oblong shape.

Reference is made to the following figures.

Figure 2:
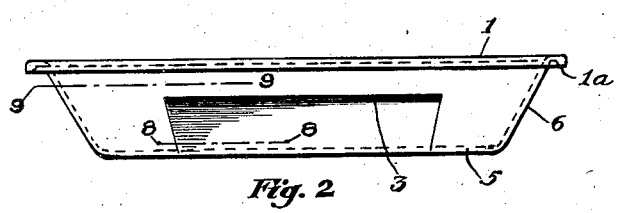
Fig. 2 is a side elevation thereof.
Figure 5:
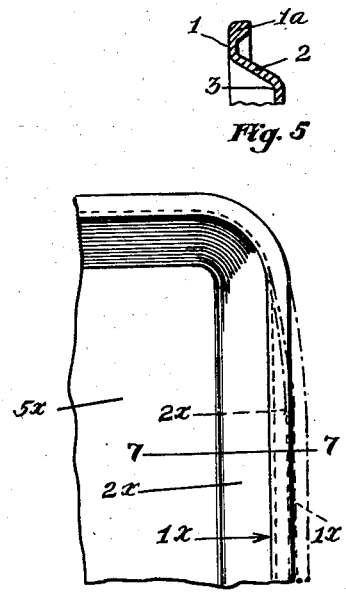
Fig. 5 is a fragmentary portion of the edge structure shown in section and slightly enlarged.
Figures 4, 8, 9:
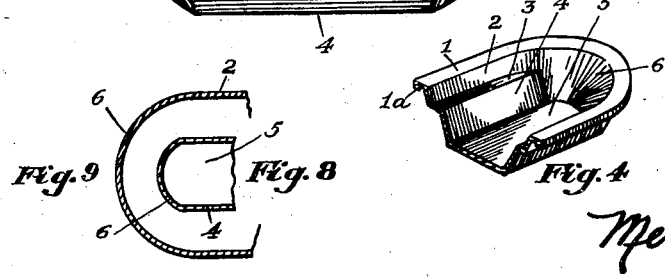
Fig. 4 is a perspective view of the article in part, portions being broken away to show its transverse cross sectional shape.

Figs. 8 and 9 are sectional plan views of one end of my article, taken on lines 8—8 and 9—9 respectively of Fig. 2.

Figure 10:
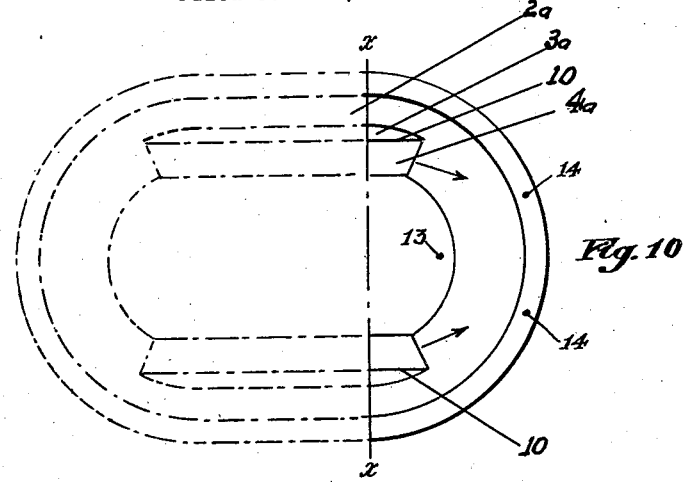
Figure 11:
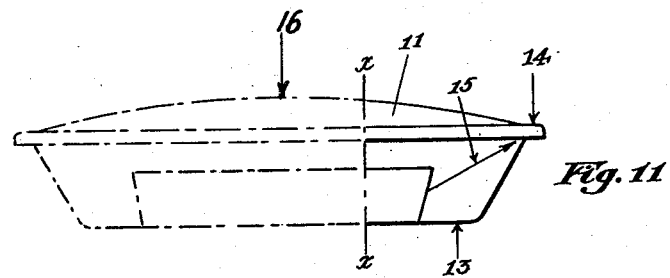
Figure 12:
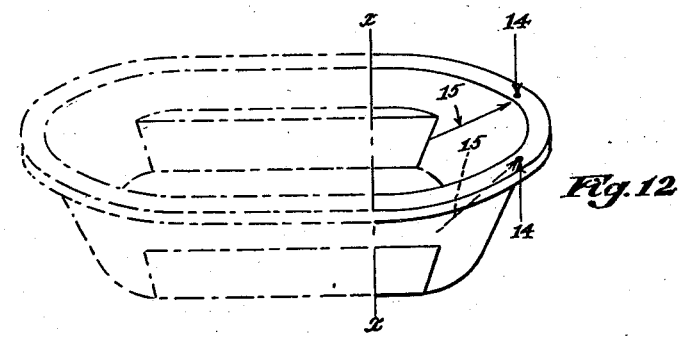

Figs. 10, 11 and 12 illustrate diagrammatically the stresses imposed on an article of this kind, and particularly on the end structure of same.

Figure 13:
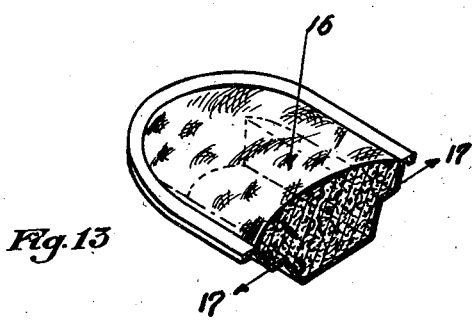

Fig. 13 shows the stresses imposed on the longitudinal walls due to the materials with which the article is filled.

Figure 6:
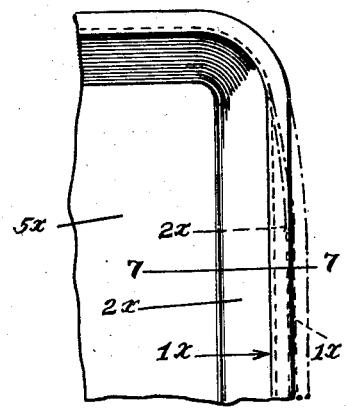
Figs. 6 and 7 show details of construction of conventional forms of articles heretofore described and used for the same purpose as my present invention.
Figure 7:
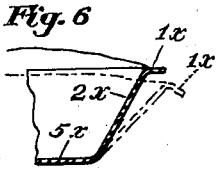

Mention has already been made of the structural weaknesses of trays made in the conventional shape, of paper board or of molded fiber. This weakness manifests itself in three ways. First, it may appear as a bulging or sagging of the side walls when the tray is filled to capacity, as is normally the case. This sagging or bulging of the side walls is illustrated in Figs. 6 and 7. Second, it may show up as sagging or breaking of the central portion of the tray when the tray is lifted by the ends. And third, sagging and breaking of the tray at or near one end when the tray is lifted by one end alone may result.

These weaknesses of trays of ordinary design have been a serious drawback to their acceptance for general use. Nor do the economics of the situation permit or encourage the making of trays of paper board or molded fiber stock of the present design sufficiently heavy and thick to relieve or eliminate the present weakness and other objectional characteristics. These articles are single service containers, hence their cost to the user must be low. They must occupy a minimum of space prior to use, hence their permissible thickness is limited. Increase of thickness and weight to secure strength and rigidity not only increases the space required for shipping and storage prior to use, but greatly increases their manufacturing cost.

It is, of course, obvious that any new design of fiber container which will eliminate the above decidedly objectionable features must be one which can be readily and inexpensively produced.

It, therefore, follows that any change in design or structure must be simple, require little if any added material, weight or shipping space, add little or nothing to production cost, and yet be effective in eliminating the objectionable features of present designs and constructions.

This has been simply, yet effectively, accomplished by the design and structure herein disclosed, and while unusually simple, its mechanical structure is very effective in eliminating or greatly reducing all three of the objectionable features before enumerated.

The design herein disclosed consists mainly of two semi-circular or frustro-conical ends, with integral reinforced and braced sloping side walls. The reinforcing structure of these side walls merges with the frustro-conical end walls and reinforces this portion of the article where such reinforcement is necessary.

It is a well known fact that a round container, or one which has its walls, whether vertical or sloping, arranged in a substantially true circle, has little tendency to sag or distort when in use. The reason for this is that the wall structure is under equal tension at all points about the circle, and there is no bending strain imposed on the wall structure at any point.

However, with an oblong article, such as is necessary in this case, certain of the structure is subjected to bending strains, these parts being largely the longitudinal sloping side walls. The end walls are made circular and in themselves are subject only to the normal tension load of round containers, except where they join the longitudinal side walls. At this point the reinforcing elements employed to strengthen and stiffen the side walls are extended to include certain portions of the circular end walls, thereby reinforcing and strengthening such portion of these circular end walls as are necessary to eliminate distortion or breakage at points where the load or strain on the end walls is other than simple tension of the wall structure.

Mention has been made of the three structural weaknesses of convention or ordinary forms of tray structure. These are:

(1) Sagging or bulging of the longitudinal walls due to pressure from the contents with which the tray is filled.

(2) Sagging or breakage of the tray through its longitudinal portion when the tray is supported by the ends.

(3) Sagging or breakage of the end structure or the longitudinal structure immediately adjacent thereto when the tray and its contents are supported at or from one end.

The elimination of objectionable features (1) is accomplished by a transverse or horizontal reinforcing member (3) made as a part of the longitudinal wall structure and located at a point intermediate the article height and at a point where the maximum output or bulging stress on the side wall is imposed by the material with which the article is filled.

Figure 1:
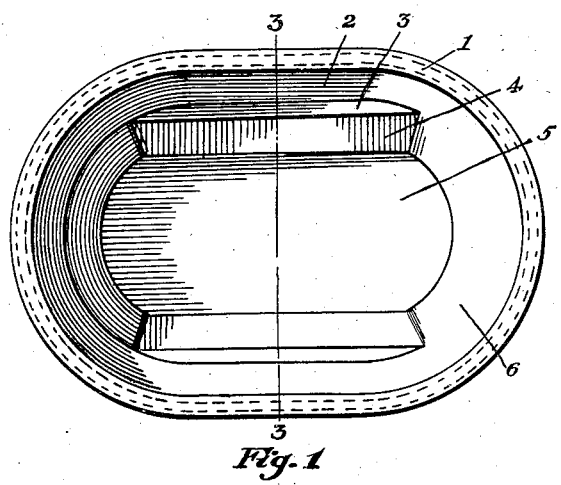
Fig. 1 is a plan view of a molded fiber article of this invention.
Figure 3:
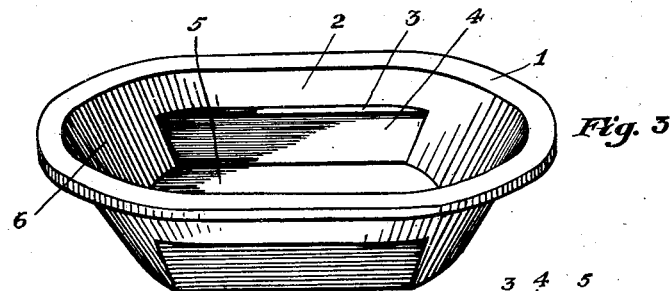
Fig. 3 is a perspective view of the article viewed from above and one side.

This reinforcing structure can best be observed in Figs. 1, 3 and 4, and it will be noted that this reinforcing member 3 is built into the side wall structure at a point approximately half way between the bottom portion 5 and the rim 1 at which point there is the maximum tendency for the side wall to bend or bulge outwardly due to pressure from the material held by the container.

The bottom portion 4 of this side wall is, of course, firmly held at its bottom edge by the bottom section 5 and also held against bending or bulging tendencies at its upper edge by the reinforcing member 3.

The upper side wall section 2 is held from outward bending or bulging at its lower edge by the aforementioned reinforcing section 3 and at its upper edge by a reinforced rim structure 1a.

It is, therefore, seen that the main side wall structure is reinforced at two points, one at a point intermediate its height, and again at its upper edge. This structure effectively reinforces and strengthens the entire side wall structure preventing and eliminating any tendency of this structure to bend outwardly, as is common with articles of conventional design and as illustrated in Figs. 6 and 7.

To effect a structural tie or connection to the circular or frustro-conical end walls, the side wall intermediate reinforcing structure is extended into and made a part of the frustro-conical end wall structure, as indicated in Figs. 10, 11 and 12. This extension of the intermediate side wall reinforcement forms in effect braces 10 in the end wall structure, these braces being formed by an extension of the lower side wall structure 4 and indicated at 4a in Figs. 10, 11 and 12, this in combination with an extension of the reinforcing side wall structure 3 and indicated at 3a in the above figures.

Considering the third objectionable feature of trays of prior design, Figs. 10, 11 and 12 disclose by arrows the loads and direction of strains imposed on the end structure of an oblong container when the load contained in such container is supported by the end of the container itself. In this case, the contents of the filled is indicated at 11, Fig. 11, shown by the dotted lines and such parts of the container extending to the right of the vertical lines X—X, constitute the portion on which the strains of supporting the tray contents are imposed. Shown in Figs. 11 and 12 are three arrows 13, 14 and 15, the arrow 15 indicating the direction at which the tray contents are imposing strains on the end structure and arrows 13 and 14 indicating the points or areas where the end structure of the tray is supported.

It will be readily observed that certain strains are imposed on the end structure under such conditions. These strains are absorbed by the end structure in two ways. First, the downward strains in the direction of arrow 14 are taken longitudinally thru the circular frustro-conical wall structure, as indicated by arrows 15, these strains being directly thru the end wall structure 6 to the bracing structure 10. This structure is an extension of the lower side wall reinforcing structure, and being integral with this structure, transmits these forces directly to it, thereby eliminating any danger of the tray bending or breaking at the point of juncture between the end wall section and the longitudinal wall section.

The upward strain imparted by the support under the tray at point 13 comes directly on an arch, integral with and built in between the braces 10, the end wall 6 and the bottom portion 5. This arch structure, therefore, being directly connected to the reinforcing braces 10 transmits the load or strain 13 directly to the reinforced side wall structure through the braces 10. As an arch is one of the strongest structures known to resist load, this design effectively and simply provides all necessary and adequate strength amply able to withstand any force applied at 13 to carry the load 11 of the filled tray.

To greatly reduce, if not entirely eliminate, prior objection (3), the side walls are reinforced against buckling by two reinforcing members, one member 3 midway of its height and another member 1a at its top edge. The bottom of the side wall is integral with the bottom 5 of the tray, therefore the entire side wall structure including parts 2 and 4 is stiffened against any buckling movement or distortion in three separate places.

A central load on the tray as shown by the arrows 16 in Figs. 11 and 13 is resisted by the stiffness and strength of the side wall structure including parts 1a, 1, 2, 3 and 4. The reinforcement at both edges and at the center forms in effect a reinforced plate girder of the side wall structure, thereby resisting any tendency to bend or buckle in the center due to the load of tray contents when the tray is supported at or near the ends.

As before mentioned, the reinforcing structure of the side wall is carried into and is integral with the frustro-conical ends, and, therefore, any central load is amply distributed through and into the end structure in an efficient manner, avoiding any localized stressing or strains.

The second objectionable feature of trays of prior design is the bulging or breaking of side walls when the tray is filled to capacity. A filled tray is shown partly in section in Fig. 13. The loads imparted on the side walls due to the outward strains are in the direction of the arrows 17 and have their maximum effect in bending bulging the side walls at a point intermediate of the side wall height or at approximately the same location as the reinforcing member 3. Therefore, any bulging or bending outwardly of the side walls is not dependent on the stiffness or thickness of the side wall itself, but is carried by the reinforcing central structure 3 and the upper reinforcing structure 1a. Therefore, the side walls can be made much thinner and lighter than would otherwise be the case, and still have an article considerably stronger than prior articles even though their walls, as well as the entire article were much thicker and heavier.

It is seen, therefore, that I have devised a simple structure which can be readily fabricated in molded fiber and which structure has in itself elements which are new and novel in molded fiber containers. These elements while simple, are extremely effective in stiffening the structure against all stresses caused by use in transporting of filled trays, or in the packing of heavy or dense materials.

Having described my invention, what I claim is:

1. A molded fiber tray comprising in combination a bottom portion, two outwardly inclined semi-circular end walls, and two outwardly inclined side walls, said side walls being formed with integral reinforcing portions intermediate of their height, extending transversely as well as longitudinally of the tray for substantially the full length of the respective side walls and merging in the end walls of the tray in spaced apart relation to one another, said reinforcing portions being shaped in a stepped formation to provide a transverse bracing flange for each wall.

2. A molded fiber tray comprising a bottom portion provided at its opposite ends with two upstanding outwardly inclined frusto-conical end walls and at its opposite sides with two upstanding outwardly inclined side walls tangentially connected directly with said frusto-conical end walls, each side wall being provided interiorly with a stepped offset extending longitudinally for the full length of said side wall and integrally intersecting the opposite end walls in chordal relation to the latter.

3. A molded fiber tray comprising a bottom portion provided at its opposite ends with two upstanding outwardly inclined frusto-conical end walls and at its opposite sides with two upstanding outwardly inclined side walls tangentially connected directly with said frusto-conical end walls, each side wall being provided interiorly with a stepped offset extending longitudinally for the full length of said side wall and integrally intersecting the opposite end walls in chordal relation to the latter, and an external flange extending uninterruptedly about the upper edges of the side and end walls.

4. A molded fiber tray comprising a bottom portion provided at its opposite ends with two upstanding outwardly inclined frusto-conical end walls and at its opposite sides with two upstanding outwardly inclined side walls tangentially connected directly with said frusto-conical end walls, each side wall being provided interiorly with a stepped offset extending longitudinally for the full length of said side wall and integrally intersecting the opposite end walls in chordal relation to the latter, and an external flange extending uninterruptedly about the upper edges of the side and end walls, said flange being provided with a thickened reinforcing outer edge.

5. A molded fiber tray comprising a bottom portion provided at its opposite sides with two upstanding outwardly inclined side walls and at its ends with two upstanding outwardly inclined end walls which have curved portions integrally connecting the side and end walls, the side walls being provided interiorly with vertically stepped offsets which extend for the full length of the side walls and taper off in the contiguous curved portions of the end walls leaving the remainder of the end walls free of such offsets.

6. A molded fiber tray comprising a bottom portion provided at its opposite sides with two upstanding outwardly inclined side walls and at its ends with two upstanding outwardly inclined end walls which have curved portions integrally connecting the side and end walls, each side wall being provided interiorly with a vertically stepped offset forming a substantially flat horizontal reinforcing member positioned approximately midway of the depth of the tray and extending for the full length of said side wall and tapering off in the contiguous curved end portions of the end walls to leave the remainder of the end walls free from such offsets.

MERLE P. CHAPLIN.